(12) United States Patent
Wang et al.

(10) Patent No.: US 9,766,686 B2
(45) Date of Patent: Sep. 19, 2017

(54) DYNAMICALLY ADJUSTING DATA PROCESSING SPEED BASED ON BUFFER UTILIZATION

(71) Applicant: Cisco Technology, Inc., San Jose, CA (US)

(72) Inventors: Yi Wang, Shanghai (CN); Ruikai Zhang, Shanghai (CN); Yongfeng Liu, Shanghai (CN); Zhou Yu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 14/154,987

(22) Filed: Jan. 14, 2014

(65) Prior Publication Data

US 2015/0198967 A1  Jul. 16, 2015

(51) Int. Cl.
*G06F 1/00* (2006.01)
*G06F 1/32* (2006.01)

(52) U.S. Cl.
CPC .......... *G06F 1/324* (2013.01); *Y02B 60/1217* (2013.01)

(58) Field of Classification Search
CPC ........... G06F 1/3206; G06F 1/324; G06F 1/08
USPC .................................................. 713/322, 320
See application file for complete search history.

(56) References Cited

U.S. PATENT DOCUMENTS

| | | | | |
|---|---|---|---|---|
| 5,513,326 A | * | 4/1996 | Nute | G06F 5/06 710/60 |
| 5,778,218 A | * | 7/1998 | Gulick | G06F 1/08 710/60 |
| 6,202,164 B1 | * | 3/2001 | Gulick | G06F 1/08 348/E5.042 |
| 6,647,502 B1 | * | 11/2003 | Ohmori | G06F 1/3203 710/57 |
| 6,865,653 B2 | * | 3/2005 | Zaccarin | G06F 1/3203 365/226 |
| 6,906,554 B1 | | 6/2005 | Chen | |
| 6,990,598 B2 | * | 1/2006 | Sherburne, Jr. | G06F 1/3203 712/E9.063 |

(Continued)

OTHER PUBLICATIONS

Sukumar, Jairam, et al. "Clock gating for power optimization in ASIC design cycle theory & practice." Proceedings of the 13th International Symposium on Low-Power Electronics and Design, 2008, ACM, New York, United States.

(Continued)

*Primary Examiner* — Chun Cao
(74) *Attorney, Agent, or Firm* — Patterson + Sheridan, LLP

(57) ABSTRACT

The embodiments disclosed herein provide a computing device that includes an upstream buffer and downstream data processing circuit that establish a data processing path where the data stored by upstream buffer is received and processed by the downstream data processing circuit. Using a buffer utilization characteristic of the upstream buffer such as its current availability (e.g., the buffer is 50% full) or an input data rate, the computing device adjusts the clock signal used to drive the downstream data processing circuit. For example, if the utilization of the upstream buffer is low, the number of clock edges in the clock signal may be reduced thereby reducing power consumption of the computing device. However, as the utilization of the buffer begins to increase, the computing device may increase the number of clock edges to prevent a buffer overflow.

17 Claims, 4 Drawing Sheets

(56) References Cited

U.S. PATENT DOCUMENTS

| | | |
|---|---|---|
| 7,337,334 B2 | 2/2008 | Kuhlmann et al. |
| 7,343,433 B2* | 3/2008 | Yoon .................. G06F 5/06 |
| | | 710/310 |
| 7,398,414 B2* | 7/2008 | Sherburne, Jr. ....... G06F 1/3203 |
| | | 712/E9.063 |
| 7,587,686 B1 | 9/2009 | Schleicher, II |
| 8,104,012 B1 | 1/2012 | Klein et al. |
| 2014/0208126 A1* | 7/2014 | Mooney .................. G06F 13/14 |
| | | 713/300 |

OTHER PUBLICATIONS

Wu, Qing, et al., "Clock-gating and its application to low power design of sequential circuits." IEEE Transactions on Circuits and Systems I: Fundamental Theory and Applications, vol. 47, Issue 3, Mar. 2000, pp. 415-420, IEEE, Piscataway, United States.

* cited by examiner

DYNAMICALLY ADJUSTING DATA PROCESSING SPEED BASED ON BUFFER UTILIZATION

TECHNICAL FIELD

Embodiments presented in this disclosure generally relate to changing a clock based on a utilization of an upstream buffer, which may result in reducing power consumption in data processing.

BACKGROUND

Power consumption in network switching chips is increasing as workloads increase. To handle additional packets, the switching chips may use faster clock frequencies in order to process the packets. Dynamic power consumption is proportional to the clock frequency as well as the switching activities of the circuit. Thus, as clock frequency increases, the power consumption of the chip does as well. Therefore, reducing the frequency of the clock signal or signals in a manner that avoids dropping data packets may reduce the power consumed by the chip without sacrificing performance.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
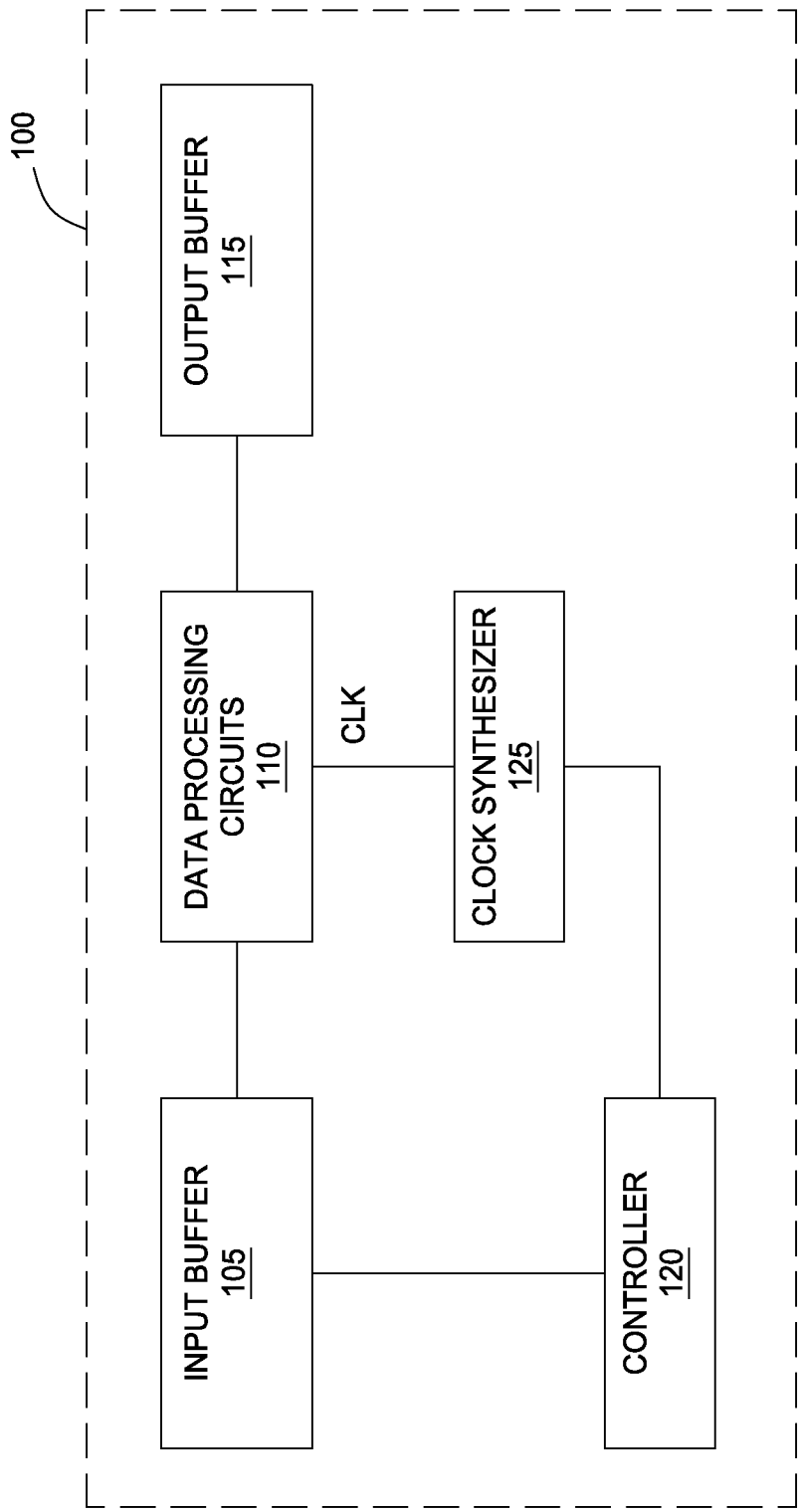
FIG. 1 is block diagram of a data processing path with an adjustable clock signal, according to one embodiment described herein.

One embodiment presented in this disclosure includes a computing device having a buffer for receiving data and a data processing circuit configured to receive and process the data stored in the buffer. The computing device also includes a controller configured to receive a buffer utilization characteristic associated with the buffer and determine an adjustment to a clock signal used to drive the data processing circuit based on the buffer utilization characteristic where the clock signal determines the speed at which the data processing circuit processes the data received from the buffer.

Another embodiment presented in this disclosure is a semiconductor chip having a buffer for receiving data and a data processing circuit configured to receive and process the data stored in the buffer. The computing device also includes a controller configured to receive a buffer utilization characteristic associated with the buffer and determine an adjustment to a clock signal used to drive the data processing circuit based on the buffer utilization characteristic where the clock signal determines the speed at which the data processing circuit processes the data received from the buffer.

Another embodiment presented in this disclosure is a method for adjusting a clock signal. The method includes transmitting data received at a buffer to a data processing circuit and identifying a buffer utilization characteristic associated with the buffer. The method also includes adjusting a clock signal used to drive the data processing circuit based on the buffer utilization characteristic, wherein the clock signal determines the speed at which the data processing circuit processes the data received from the buffer.

EXAMPLE EMBODIMENTS

The embodiments described below monitor the usage of an upstream buffer to adjust the clock signal used to drive downstream data processing circuits. A controller may monitor the utilization of the upstream buffer by tracking the current availability of the upstream buffer (e.g., the buffer is 80% full) or the rate at which data is received by the buffer. Based on this information, the controller may transmit instructions to a clock synthesizer that generates a clock signal for the data processing circuits downstream of the upstream buffer. For example, the controller may instruct the clock synthesizer to change the clock signal such that the downstream data processing circuits either process the data stored in the upstream buffer at a faster or slower rate depending of the utilization of the buffer. In general, the data processing rate is sped up with increased buffer utilization and slowed down with decreased buffer utilization.

In one embodiment, the controller may compare the upstream buffer utilization to one or more thresholds to determine whether the number of clock edges in a given time period of the clock signal should be increased or decreased. For example, if the upstream buffer is 90% full, the controller may increase the frequency of the clock signal by 10%. If the upstream buffer becomes 95% full, the controller may increase the frequency of the clock signal by another 10%. In another embodiment, the controller may use clock gating in order to change how fast the data processing circuits process the data stored in the upstream buffer. By using thresholds and adjusting the clock signal accordingly, the controller is able to save power by reducing the number of clock edges in the clock signal for a given time period when buffer utilization is low. Conversely, when buffer utilization is high, the controller can avoid a buffer overflow by increasing the number of clock edges in the clock signal for a given time period.

FIG. 1 is block diagram of a data processing path with an adjustable clock signal, according to one embodiment described herein. As shown, the data processing path includes input buffer 105, data processing circuits 110, and output buffer 115. In this path, data is received at the input buffer 105, processed by the data processing circuits 110, and then stored in the output buffer 115. That is, input buffer 105 is upstream from the data processing circuits in the data processing path—i.e., input buffer 105 is one type of an upstream buffer. In one non-limiting example, the data processing path may be used in a network device (e.g., router, switch, hub, etc.) that uses the path to process received data packets. The packets may be received at the input buffer 105 via a network (e.g., a WAN or LAN) from another network device or a client device. To process the packet, the data processing circuits 110 may include circuit logic for evaluating information in a packet header (e.g., destination address, quality of service data, VLAN assignment, and the like) and determine how to forward the packet in the network.

The various circuit elements shown in FIG. 1 may be integrated into one or more semiconductor chips. As shown here, the components are integrated into a single application-specific integrated circuit (ASIC) 100 which may be located in a computing device (e.g., a network device or server). In other embodiments, however, the components may be located on separate ASICs that are communicatively coupled. For example, the input buffer 105, data processing circuits 110, output buffer 115, and clock synthesizer 125 may be located on a first ASIC while the controller 120 is located on a second ASIC.

In one embodiment, the data processing circuits 110 may include circuit logic for changing the packets such as adding layers to the packets or changing the information stored in the header. Although not shown, the data processing circuits 110 may be divided into different portions for processing the data stored in the input buffer 105. For example, the processing circuits 110 may include a first portion for decoding the information in a packet header and a second portion for updating the information stored in the header or payload of the packet. Furthermore, the portions may be pipelined such that the processing circuits 110 may process different packets at different portions simultaneously. In one embodiment the data processing circuits 110 may retrieve packets stored in buffer 105 one at a time or in chunks.

After the data retrieved from the input buffer 105 is processed by the circuits 110, the processed data is stored in the output buffer 115. As will be discussed later, in one embodiment, the output buffer 115 may serve as an input buffer for another stage of the data processing path that includes additional data processing circuits. Alternatively, the output buffer may serve as an interface where the packets are stored until they are forwarded to another network device. Although a network device is specifically mentioned, the present disclosure is not limited to such. In other embodiments, the techniques described below may apply to stream computing environments, pipeline processing systems, or any other data processing system that evaluates chunks of data along a data processing path.

The input buffer 105 is communicatively coupled to the controller 120 such that the utilization of the buffer 105 can be monitored. The controller 120 may be a processing element that includes logic for determining how to adjust the clock signal (CLK) used to drive the data processing circuits 110 based on the utilization of the input buffer 105. As used herein, the "utilization" of the buffer 105 includes how much data is stored in the buffer 105 or the rate at which data is being received at the buffer 105. That is, the input buffer 105 may periodically transmit to the controller 120 a status signal indicating the available memory locations in the input buffer 105. From this information, the controller 120 may determine the current availability of the buffer 105 (e.g., the buffer is 20% full). Additionally or alternatively, the input buffer 105 may transmit to the controller 105 the rate at which the buffer 105 is receiving data from an upstream source (e.g., an external network device). For example, the input buffer 105 may be only 20% full but the rate at which data arrives increased from 100 MB/sec to 125 MB/sec. In one embodiment, the controller 120 may be configured to keep the occupancy of the memory locations of the input buffer low even as the data rate increases. As such, the controller 120 may increase the clock signal used by the data processing circuits 110 so that data flows through the data processing path quicker which may keep the input buffer number of occupied memory locations from increasing—e.g., the buffer 105 remains only 20% full.

To adjust the clock signal, the controller 120 is coupled to the clock synthesizer 125 which generates the clock signal used by the data processing circuits 110 when processing the data stored in the input buffer. The clock synthesizer 125 may generate an original clock signal or may adjust an already generated clock signal. As an example of the latter, the clock synthesizer 125 may use a global clock signal in the ASIC 100 which the synthesizer 125 alters to generate the customized clock signal (CLK) used to drive the data processing circuits 110. In one embodiment, the data processing circuits 110 include memory storage elements such as latches or flip-flops that trigger off a rising edge or falling edge (or both) of the CLK signal. Additionally or alternatively, the data processing circuits 110 may include a processing element (e.g., a network processor) that uses the CLK signal to process the data (e.g., decode the data, alter the data, encapsulate the data, etc.). By changing the CLK signal, the clock synthesizer changes the rate at which data is processed by the data processing circuits 110. Increasing the number of rising or falling edges in a given time period results in the processing circuits 110 processing the data stored in the input buffer 105 faster while decreasing the number of rising or falling edges in the given time period results in the processing circuits 110 processing the stored data slower.

Generally, the faster the CLK signal or the greater the number of rising or falling edges in a given time period, the more power is consumed by the ASIC 100. This increase in power consumption may result from the power needed to generate the clock signal itself (e.g., the power consumed by the circuitry that generates the CLK signal) or the power consumed by the storage or processing elements that are driven by the clock signal. If the utilization of the input buffer 105 is low, the controller 120 may be able to reduce the CLK signal and still avoid a buffer overflow (e.g., the input buffer 105 is asked to store more data than it has capacity). To reduce the power consumption, the controller 120 monitors the utilization of the input buffer 105 and adjusts the CLK signal in a manner that avoids buffer overflow (e.g., prevents dropped packets) but reduces power consumption. For instance, if the controller 120 determines that the utilization of buffer 105 increases, the controller 120 may instruct the clock synthesizer 125 to increase the number of rising and falling edges in a given time period to prevent the input buffer 105 from overflowing. A more detailed explanation of the different techniques for adjusting the CLK signal based on buffer utilization is provided below in the discussion accompanying FIG. 3.

Figure 2:
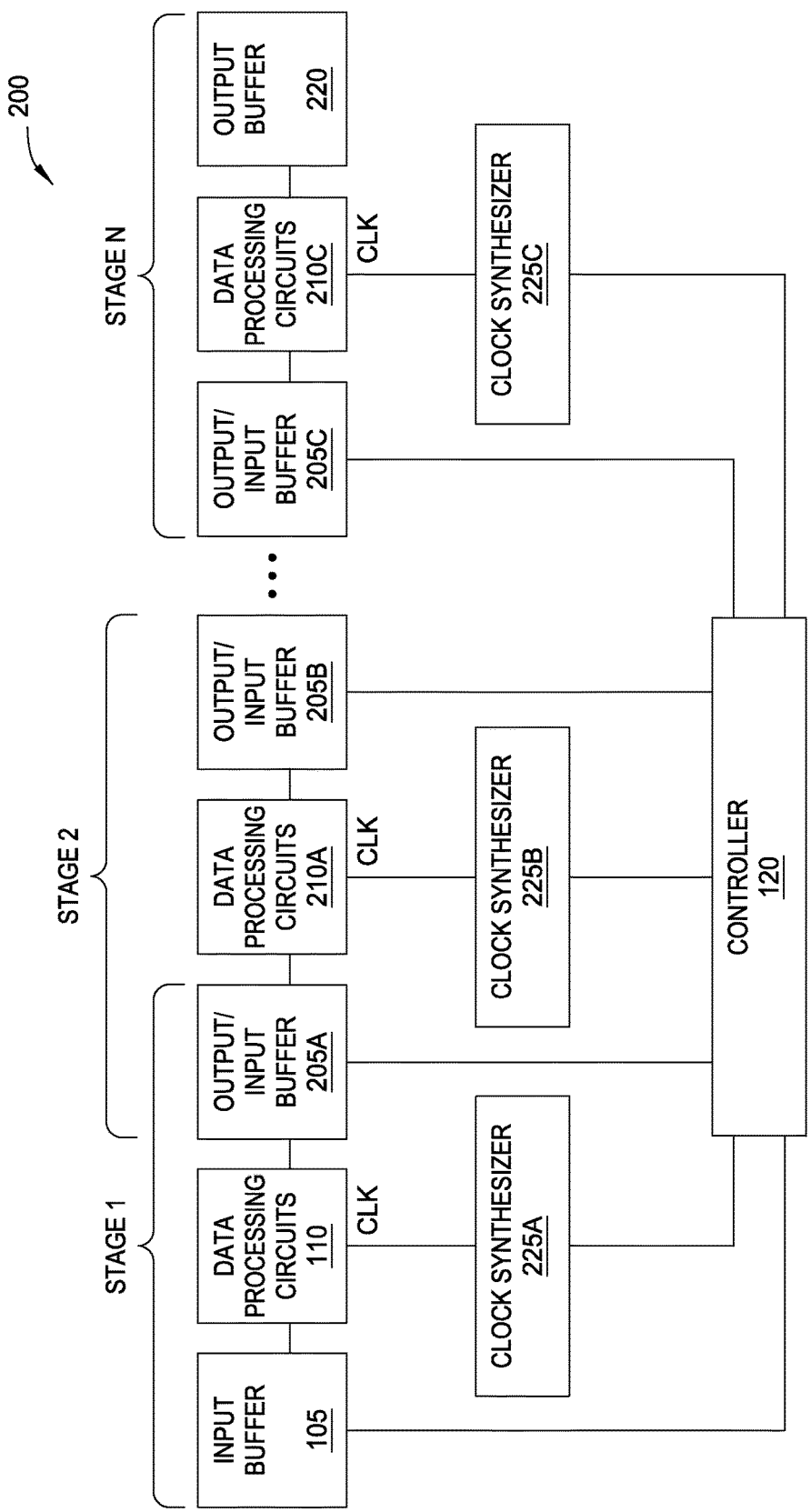
FIG. 2 is a block diagram of a data processing path with multiple stages each with respective adjustable clock signals, according to one embodiment described herein.

FIG. 2 is a block diagram of a data processing path with multiple stages each with respective adjustable clock signals, according to one embodiment described herein. System 200 illustrates that a computing device may include multiple stages in the data processing path. System 200 may be a single ASIC or may be located on multiple ASICs within the computing device.

Like in FIG. 1, system 200 receives data at an input buffer 105 which is then retrieved and processed by the data processing circuits 110. The processed data is then stored in an output/input (0/I) buffer 205A. Thus, unlike in FIG. 1 which illustrates a single stage data processing path, system 200 illustrates a plurality of chained stages where the output buffer of one stage serves as the input buffer of the other stage. Thus, the 0/I buffer 205A is upstream from the data processing circuits 210A in the second stage—i.e., the input buffer 105 and 0/I buffer 205A are both upstream buffers. In one embodiment, each stage may perform one or more task for processing the data. For example, if system 200 is part of a network device, Stage 1 may decode a packet header, Stage 2 may modify the data information in the header, and Stage 3 may identify the next destination for the packet. Alternatively, system 200 may be part of a stream computing system where Stage 1 performs a comparison between two data chunks, Stage 2 updates one of the data chunks based on the comparison, and Stage 3 saves one of the data chunks to an external memory location. In this manner, the various stages may be used sequentially to process data received by the input buffer 105.

In one embodiment, the O/I buffers 205 provide a timing barrier for isolating the various stages of the data processing path. Thus, the controller 120 may adjust the CLK signals for the respective stages 1-N independently. That is, the CLK signal used to drive the data processing circuits 110 in Stage 1 may be different from or the same as the CLK signal used to drive the data processing circuits 210A in Stage 2. For example, the different stages may use a different number of clock cycles to process the data, and thus, the controller 120 may be able to independently adjust the CLK signals such that data overflow is avoided in all of the buffers 105, 205. For instance, the utilization of input buffer 105 may be low thereby permitting the controller 120 to decrease the number of clock edges in the CLK signal transmitted to the data processing circuits 110. However, because the data processing circuits 210A in Stage 2 may require more clock cycles to process the data than the circuits 110 in Stage 1, the controller 120 may not decrease the CLK signal transmitted to the circuits 210A. In this manner, the controller 120 may independently adjust the CLK signals to account for the time required for the different data processing circuits 110, 205 to process the data, to account for different buffer sizes, or to account for workloads which may differ between the processing circuits 110, 210.

Although FIG. 2 illustrates a single controller 120, in other embodiments, the controller 120 may be distributed. For example, each stage may include a respective controller connected to the input buffers 105, 205. Moreover, in one embodiment, the CLK signals for each stage may not be independently adjustable. That is, system 200 may use the same CLK signal for each of the data processing circuits 110 and 210. In this scenario, system 200 may include only one clock synthesizer 225 rather than the plurality shown.

After the data received by the input buffer 105 is processed by the various stages, the processed data is stored in an output buffer 220. In one embodiment, system 200 may forward the processed data to an external computer device. For instance, the system 200 may be a network device which forwards processed packets stored in the output buffer 220 in a network. Alternatively, the processed data in buffer 220 may be transmitted to other internal systems within the same ASIC or same computing device.

Figure 3:
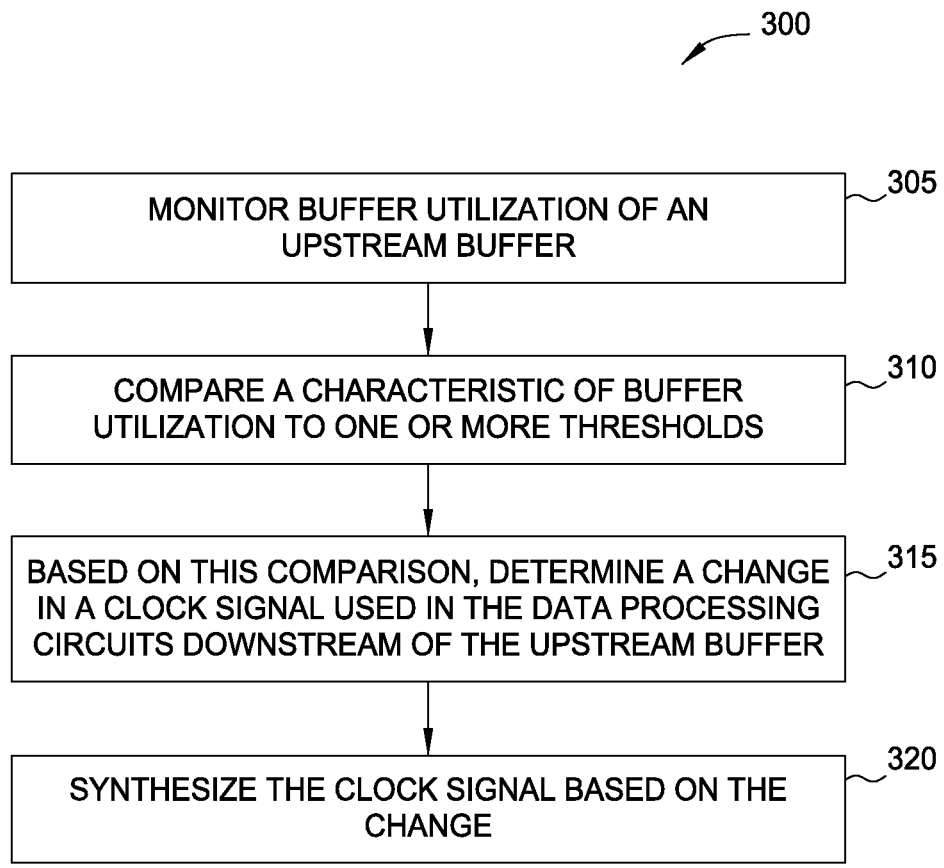
FIG. 3 is a flow chart for adjusting a clock signal based on buffer utilization, according to one embodiment described herein.

FIG. 3 is a flow chart 300 for adjusting a clock signal based on buffer utilization, according to one embodiment described herein. At block 305, the controller monitors at least one characteristic of the upstream buffer indicative of buffer utilization. The characteristic includes current available memory locations, input data rate (e.g., number of packets received at the upstream buffer during a given time period), output data rate, and the like. In one embodiment, the upstream buffer may inform the controller of the current utilization of the upstream buffer—e.g., the buffer is 80% full. Alternatively, the controller may derive the current utilization of the upstream buffer based on the received characteristics.

At block 310, the controller compares the buffer utilization characteristic to one or more thresholds. For example, the controller may compare the input date rate or the availability of the buffer to a predefined threshold—e.g., 5000 packets/second or 80% full. In one embodiment, the controller may compare the utilization characteristic to a plurality of thresholds such that depending on which threshold is satisfied by the value of the utilization characteristic determine how the controller adjusts the clock signal for the downstream data processing circuits.

Furthermore, the controller may consider multiple utilization characteristics when adjusting the CLK signal. For instance, the controller may compare both the current availability of the upstream buffer as well as the input data rate to one or more thresholds. The controller may only adjust the clock rate if both of the characteristics satisfy a threshold—e.g., the current availability is less than 10% and the data rate is greater than 100 MB/sec.

In one embodiment, the controller may determine trending data based on the measured utilization characteristics. To do so, the controller may measure the utilization characteristics at different times and derive a trend from these different data points. For example, the controller may compare the rate at which the current availability or input data rate is changing to one or more thresholds. Furthermore, the controller can combine these derived characteristics with the measured characteristics to determine when to adjust the CLK signal. For instance, the controller may adjust the CLK signal only if the data rate is increasing by 10 MB every second and the current availability of the upstream buffer is less than 20%.

At block 315, the controller determines a change in the CLK signal used by the downstream data processing circuits based on the comparison of the utilization characteristic or characteristics with the thresholds. That is, depending on which threshold is satisfied by the utilization characteristic determines how the controller adjusts the CLK signal. If more than one threshold is used, each threshold may be associated with a different adjustment to the CLK signal. For example, if the current availability of the upstream buffer falls below 50% (a first threshold), the controller may increase the number of edges in the CLK signal for a given time period by 10%. If the current availability of the buffer then falls below 25% (a second threshold), the controller may increase the number of clock edges by 30%. To increase granularity, the number of predefined thresholds that are compared against the measured or derived utilization characteristics may be increased. Moreover, the changes in the number of clock edges associated with the thresholds may be adjusted in order to ensure the upstream buffer does not overflow. That is, as the buffer utilization increases, the change in the CLK signal may increase either linearly or exponential to prevent buffer overflow.

The reverse process may be followed as the buffer utilization decreases. Continuing the previous example, if the current availability increases above 25% (i.e., the upstream buffer is less than 75% full), the controller may reduce the number of clock edges by 30%. If the current availability increases above 50%, the controller may reduce the clock edges by 10%. Thus, the controller may keep track of which thresholds the utilization characteristic has currently satisfied using, for example, a state machine so that the number of clock edges can be reduced as the utilization characteristic indicates that buffer utilization is decreasing. As discussed above, reducing the number of clock edges in the CLK signal may reduce the power consumed by the systems shown in FIGS. 1 and 2. Thus, in a data processing system where the data rate for receiving new data may change, the buffer utilization may be used to intelligently adjust the CLK signal in order to reduce power consumption.

In another embodiment, instead of using thresholds, the controller may use an equation or relationship to control the CLK signal. For example, for any value of a measured or derived utilization characteristic, the equation may derive a corresponding CLK signal frequency. The equation may be configured such that as the buffer utilization increases, the number of edges in the CLK signal also increases to ensure that a buffer overflow does not occur. For example, the controller may use a simple relationship where the number of clock edges changes proportionally to the percentage of occupied memory locations in the upstream buffer. In one embodiment, the controller may change the edges in the CLK signal linearly or exponentially relative to the buffer utilization. By using a relationship such as an equation, the controller can continuously control the CLK signal based on the measured or derived utilization characteristics rather than discretely using one or more thresholds.

At block 320, based on instructions received from the controller, the clock synthesizer generates the CLK signal. Specifically, the clock synthesizer adjusts the number of clock edges in the CLK signal as instructed by the controller. One technique of changing the number of clock edges in a given time period is by changing the frequency of the CLK signal. Assuming the CLK signal is a periodic signal (e.g., a square wave), increasing the frequency of the CLK signal increases the number of edges in a fixed time period while decreasing the frequency reduces the number of edges in the fixed time period. Another technique for changing the number of clock edges in the fixed time period is clock gating. In this technique, a received clock signal is masked so that the number of clock edges in the resulting clock signal is reduced.

Depending on the particular technique used to adjust the CLK signal, the clock synthesizer either generates an original CLK signal or derives an altered CLK signal based on a received clock signal. As an example of the latter, the clock synthesizer may use a global clock signal in an ASIC which the synthesizer then adjusts based on the instructions received from the controller.

Figure 4:
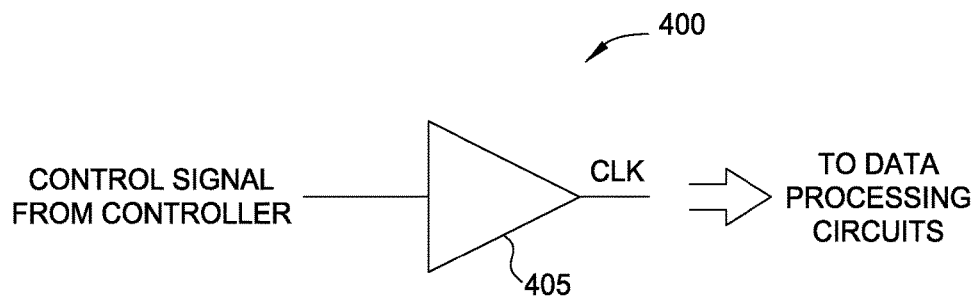
FIG. 4 is a circuit diagram for adjusting a clock signal, according to one embodiment described herein.

FIG. 4 is a clock synthesizer 400 for adjusting a clock signal, according to one embodiment described herein. The synthesizer 400 includes a driver 405 which includes circuitry for generating the CLK signal based on a control signal from the controller. For example, the control signal may indicate a desired frequency of the CLK signal which determines the number of clock edges in the CLK signal. Based on this signal, the driver 405 outputs the CLK signal with the corresponding frequency. In this manner, clock synthesizer 400 generates an original clock signal based on the control signal provided by the controller. As buffer utilization changes as described in method 300 of FIG. 3, the output of the driver 405 will also change. That is, as the buffer utilization decreases, the driver 405 decreases the frequency of the CLK signal and the number of clock edges, thereby reducing power consumption.

Although clock signals are described herein as square waves, the present disclosure is not limited to such. Other modulated signals (either periodic or non-periodic) may be used as the CLK signal which can be adjusted based on buffer utilization. Examples of periodic signals include sawtooth or sinusoidal signals while an example of non-periodic signal includes discrete bursts. By adjusting the frequency of the periodic signals or the spacing of the bursts (or the duration of the bursts), the clock synthesizer 400 can adjust the number of clock edges in a give time period thereby changing the consumed power.

Figure 5A:
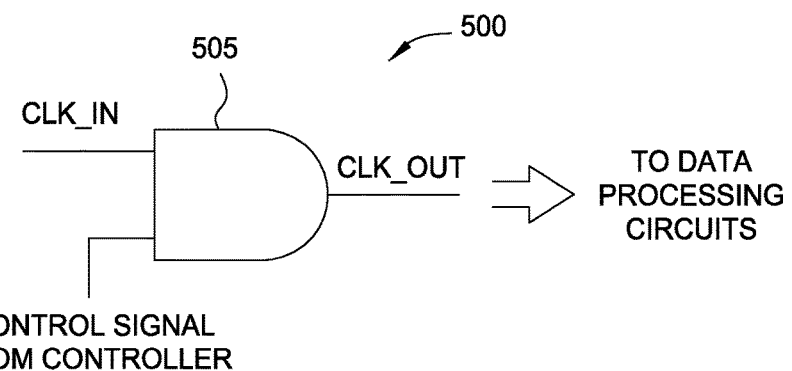
FIGS. 5A-5B is a circuit diagram and timing chart for adjusting a clock signal using clock gating, according to one embodiment described herein.
Figure 5B:
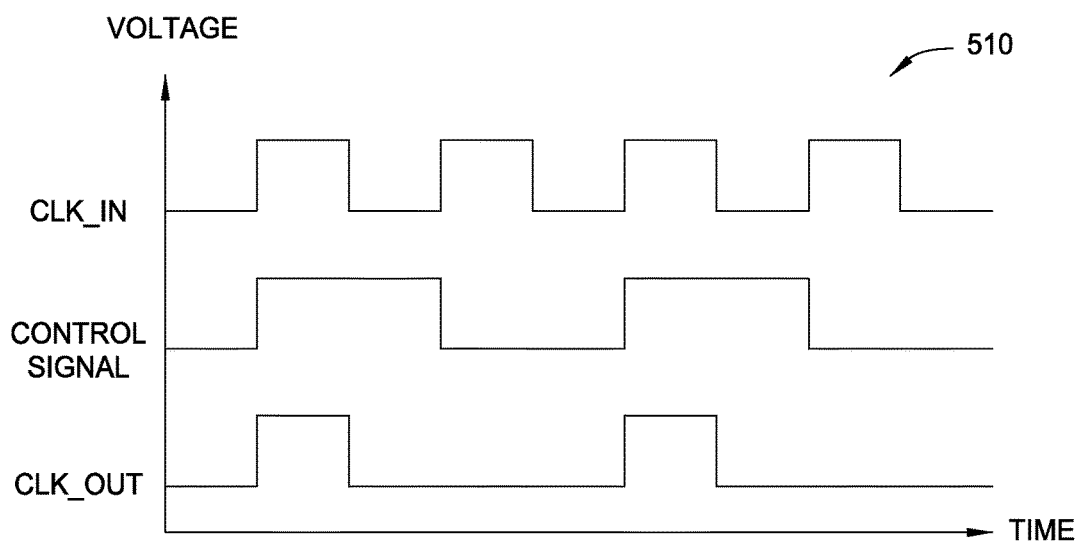

FIGS. 5A-5B illustrate a clock synthesizer 500 and timing chart 510 for adjusting a clock signal using clock gating, according to one embodiment described herein. As shown, the clock synthesizer 500 in FIG. 5A uses clock gating logic 505 for changing the number of clock edges in the CLK signal. Logic 505 is shown here as an AND gate but is not limited to such. The logic 505 includes two inputs: a received clock signal (CLK_IN) and the control signal from the controller. The received clock signal may be any global or local clock signal. For example, the CLK_IN may be generated by the controller and then altered by the synthesizer 500 or may be a clock signal used by other systems in an ASIC (e.g., a global clock signal).

Based on the control signal, the received clock signal is masked so that the number of clock edges in the resulting output clock signal (CLK_OUT) is reduced. That is, the received clock signal represents the maximum number of possible clock edges for a given time period which are then selectively reduced by the control signal from the controller. Generally, as buffer utilization decreases, the controller masks one or more of the clock edges in a given time period to conserve power. As buffer utilization increases, the control signal masks less of the clock edges until eventually CLK_OUT is equivalent to CLK_IN which, in one embodiment, represents the maximum frequency the data processing circuits can be operated.

The timing chart 510 in FIG. 5B illustrates one example of adjusting the number of clock edges in the CLK signal (e.g., CLK_OUT). As shown, based on the buffer utilization, the controller determines to mask 50% of the clock edges in the CLK_IN signal. During half of the CLK_IN clock cycles the control signal is HIGH and for the other half the control signal is LOW. Based on the logic defined by the AND gate 505, when the control signal is HIGH, CLK_OUT follows CLK_IN. However, when the control signal is LOW, CLK_OUT remains LOW. For the time period shown, clock gating results in a 50% reduction in the number of clock edges in the CLK_OUT signal relative to the CLK_IN signal thereby conserving power.

Of course, the controller may use the control signal to adjust the number of clock edges by other ratios besides the one shown (e.g., 25% or 75% reduction in clock edges). Furthermore, FIGS. 5A-5B illustrate just one non-limiting example of clock gating. The present disclosure, however, may be used with any technique for clock gating that permits a controller to adjust the number of clock edges in a given time period.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computing device, comprising:
a buffer for receiving data;
a data processing circuit configured to receive and process the data from the buffer; and
a controller configured to:
receive a first input data rate associated with the buffer during a first time period, wherein the input data rate represents the amount of data received at the buffer over a period of time,
receive a second input data rate associated with the buffer during a second time period,
determine a control signal for a clock gating circuit based on a data rate trend, wherein the data rate trend is based on the first input data rate and the second input data rate, and
inputting the control signal into an AND logic circuit to mask cycles of a first clock signal to output an adjusted clock signal used to drive the data processing circuit, wherein the adjusted clock signal dictates the speed at which the data processing circuit processes the data received from the buffer.

2. The computing device of claim 1, wherein the controller is further configured to:
receive an availability of memory locations in the buffer, and
determine the control signal for the clock gating circuit based on both of the data rate trend and the availability of memory locations in the buffer.

3. The computing device of claim 1, wherein the controller is configured to:
compare the data rate trend to at least one threshold, wherein the determined control signal is associated with the threshold, wherein the determined control signal is predefined to reduce power consumption in the computing device.

4. The computing device of claim 1, further comprising:
a first processing stage comprising the buffer and the data processing circuit;
and a second processing stage, the second processing stage is downstream from the first processing stage in a data processing path, wherein the downstream data processing circuit in the first processing stage is coupled to an output/input buffer in the second processing stage such that data processed by the data processing circuit is stored in the output/input buffer, the second processing stage further comprising a different data processing circuit configured to receive and process the data stored in the output/input buffer.

5. The computing device of claim 4, wherein the controller is configured to independently adjust the clock signal used to drive the data processing circuit of the first processing stage based on the data rate trend of the buffer in the first processing stage and adjust a different clock signal used to drive the different data processing circuit in the second processing stage based on an input data rate of the output/input buffer.

6. The computing device of claim 1, wherein the computing device is a network device and the data stored in the buffer are network packets that are received and processed by the data processing circuit.

7. A semiconductor chip, comprising:
a buffer for receiving data;
a data processing circuit configured to receive and process the data from the buffer; and
a controller configured to:
receive a first input data rate associated with the buffer during a first time period, wherein the input data rate represents the amount of data received at the buffer over a period of time,
receive a second input data rate associated with the buffer during a second time period,
determine a control signal for a clock gating circuit based on a data rate trend, wherein the data rate trend is based on the first input data rate and the second input data rate, and
inputting the control signal into an AND logic circuit to mask cycles of a first clock signal to output an adjusted clock signal used to drive the data processing circuit, wherein the adjusted clock signal dictates the speed at which the data processing circuit processes the data received from the buffer.

8. The semiconductor chip of claim 7, wherein the controller is further configured to:
receive an availability of memory locations in the buffer, and
determine the control signal for the clock gating circuit based on both of the data rate trend and the availability of memory locations in the buffer.

9. The semiconductor chip of claim 7, wherein the controller is configured to:
compare the data rate trend to at least one threshold, wherein the determined control signal is associated with the threshold, wherein the determined control signal is predefined to reduce power consumption in the computing device.

10. The semiconductor chip of claim 7, further comprising:
a first processing stage comprising the buffer and the data processing circuit;
and a second processing stage, the second processing stage is downstream from the first processing stage in a data processing path, wherein the data processing circuit in the first processing stage is coupled to an output/input buffer in the second processing stage such that data processed by the data processing circuit in the first processing stage is stored in the output/input buffer, the second processing stage further comprising a different data processing circuit configured to receive and process the data stored in the output/input buffer.

11. The semiconductor chip of claim 10, wherein the controller is configured to independently adjust the clock signal used to drive the data processing circuit of the first processing stage based on the data rate trend of the buffer in the first processing stage and adjust a different clock signal used to drive the different data processing circuit in the second processing stage based on an input data rate of the output/input buffer.

12. The semiconductor chip of claim 7, wherein the data stored in the buffer are network packets that are received and processed by the data processing circuit.

13. A method, comprising:
transmitting data received at a buffer to a data processing circuit;
identifying a first input data rate associated with the buffer during a first time period, wherein the input data rate represents the amount of data received at the buffer over a period of time;
identifying a second input data rate associated with the buffer during a second time period;

determining a control signal for a clock gating circuit based on a data rate trend, wherein the data rate trend is based on the first input data rate and the second input data rate; and inputting the control signal into an AND logic circuit to mask cycles of a first clock signal to output an adjusted clock signal used to drive the data processing circuit, wherein the adjusted clock signal dictates the speed at which the data processing circuit processes the data received from the buffer.

14. The method of claim 13, further comprising comparing the data rate trend to at least one threshold, wherein the determined control signal is associated with the threshold, wherein the determined control signal is predefined to reduce power consumption in the computing device.

15. The method of claim 13, wherein the buffer and the data processing circuit are included in a first processing stage, and an output/input buffer and different processing circuit are included in a second processing stage downstream from the first processing stage in a data processing path, wherein the data processing circuit in the first processing stage is coupled to the output/input buffer in the second processing stage such that data processed by the data processing circuit in the first processing stage is stored in the output/input buffer.

16. The method of claim 15, further comprising:

adjusting a different clock signal used to drive the different data processing circuit in the second processing stage based on a received input data rate of the output/input buffer, wherein adjusting the different clock signal is performed independently of adjusting the clock signal used to drive the data processing circuit.

17. The method of claim 13, wherein the data stored in the buffer are network packets that are received and processed by the data processing circuit.

* * * * *

UNITED STATES PATENT AND TRADEMARK OFFICE
CERTIFICATE OF CORRECTION

PATENT NO.        : 9,766,686 B2                                        Page 1 of 1
APPLICATION NO.   : 14/154987
DATED             : September 19, 2017
INVENTOR(S)       : Yi Wang et al.

It is certified that error appears in the above-identified patent and that said Letters Patent is hereby corrected as shown below:

In the Specification

In Column 5, Line 7, delete "(0/I)" and insert -- (O/I) --, therefor.

In Column 5, Line 11, delete "0/I" and insert -- O/I --, therefor.

In Column 5, Line 13, delete "0/I" and insert -- O/I --, therefor.

In Column 8, Line 15, delete "give" and insert -- given --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*